(12) United States Patent
Kojima

(10) Patent No.: US 9,950,600 B2
(45) Date of Patent: Apr. 24, 2018

(54) GLASS RUN FOR AUTOMOTIVE DOOR

(71) Applicant: NISHIKAWA RUBBER CO., LTD., Hiroshima-shi, Hiroshima (JP)

(72) Inventor: Masahiro Kojima, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 0 days.

(21) Appl. No.: 15/450,366

(22) Filed: Mar. 6, 2017

(65) Prior Publication Data
US 2017/0259659 A1     Sep. 14, 2017

(30) Foreign Application Priority Data

Mar. 8, 2016   (JP) ................................ 2016-044149

(51) Int. Cl.
| | | |
|---|---|---|
| *B60J 10/88* | (2016.01) | |
| *B60J 10/23* | (2016.01) | |
| *B60J 10/277* | (2016.01) | |
| *B60J 10/33* | (2016.01) | |

(52) U.S. Cl.
CPC .............. *B60J 10/88* (2016.02); *B60J 10/23* (2016.02); *B60J 10/277* (2016.02); *B60J 10/33* (2016.02)

(58) Field of Classification Search
CPC ................................ B60J 10/277; B60J 10/88
See application file for complete search history.

(56) References Cited

U.S. PATENT DOCUMENTS

| | | | | |
|---|---|---|---|---|
| 6,205,712 B1 * | 3/2001 | Ellis | ......................... | B60J 10/79 49/377 |
| 8,051,606 B2 * | 11/2011 | Maaβ | ....................... | B60J 10/21 49/479.1 |
| 9,694,660 B2 * | 7/2017 | Kameoka | ................. | B60J 10/50 |
| 2004/0111973 A1 * | 6/2004 | Moisy | ...................... | B60J 10/32 49/490.1 |
| 2009/0021044 A1 * | 1/2009 | Maab | ...................... | B60J 10/74 296/146.2 |
| 2009/0223135 A1 * | 9/2009 | Bocutto | ................... | B60J 10/02 49/493.1 |
| 2010/0077670 A1 * | 4/2010 | Jimenez | ................... | B60J 10/88 49/479.1 |
| 2014/0033614 A1 * | 2/2014 | Bartolomucci | ........ | B60J 10/088 49/506 |

FOREIGN PATENT DOCUMENTS

| | | | | | |
|---|---|---|---|---|---|
| DE | 4441346 C1 | * | 3/1996 | ............. | B60J 10/24 |
| JP | 08011549 A | * | 1/1996 | ............ | B60J 10/248 |
| JP | 2005247294 A | * | 9/2005 | ............. | B60J 10/79 |
| JP | 2008-518135 A | | 5/2008 | | |
| JP | 2009056924 A | * | 3/2009 | ............ | B60J 10/277 |

* cited by examiner

*Primary Examiner* — Katherine W Mitchell
*Assistant Examiner* — Marcus Menezes
(74) *Attorney, Agent, or Firm* — Renner, Otto, Boisselle & Sklar, LLP

(57) ABSTRACT

A glass run 20 includes a glass run body 21 and a lip 22. The glass run body 21 is assembled to a glass run attachment plate 10 of a window frame 3, and the lip 22 made of an elastic material covers a flange 11 of the window frame 3. The lip 22 is formed to bend from the outside toward the inside of the passenger compartment with respect to the flange. The lip 22 includes a recess 22*d* formed on an interior face of a portion, of the lip, covering a protrusion of the flange 11. The recess 22*d* acts as a pivot of a change in a shape of the lip 22 when the lip 22 is opened.

5 Claims, 9 Drawing Sheets

OUTSIDE OF PASSENGER COMPARTMENT ←       → INSIDE OF PASSENGER COMPARTMENT

OUTSIDE OF
PASSENGER ←
COMPARTMENT

INSIDE OF
→ PASSENGER
COMPARTMENT

OUTSIDE OF PASSENGER COMPARTMENT ← → INSIDE OF PASSENGER COMPARTMENT

OUTSIDE OF PASSENGER COMPARTMENT ←

INSIDE OF PASSENGER COMPARTMENT →

OUTSIDE OF PASSENGER COMPARTMENT ←

→ INSIDE OF PASSENGER COMPARTMENT

OUTSIDE OF PASSENGER COMPARTMENT ←

→ INSIDE OF PASSENGER COMPARTMENT

GLASS RUN FOR AUTOMOTIVE DOOR

CROSS-REFERENCE TO RELATED APPLICATION

This application claims priority to Japanese Patent Application No. 2016-044149 filed on Mar. 8, 2016, the entire disclosure of which is incorporated by reference herein.

BACKGROUND

The present disclosure relates to a glass run to be disposed on a window frame of an automotive door. In particular, the present disclosure belongs to a technical filed of a construction which involves assembling the glass run to the window frame from the outside of a passenger compartment.

There are several types of doors provided to a side of a car. One type of those doors has a window frame holding a circumferential edge of a window glass. The door having this window frame is provided with a glass run to seal a gap between the window frame and the window glass.

A glass run disclosed in Japanese Unexamined Patent Publication (Translation of PCT Application) 2008-518135 is assembled to the window frame from the outside of a passenger compartment. Specifically, the window frame is provided with: a glass run attachment plate, to which a glass run body is assembled, extending in the inside-outside direction of the passenger compartment; and a flange protruding downward from the glass run attachment plate facing the inside of the passenger compartment. Meanwhile, a lip covering the flange of the window frame is integrated with the glass run body. The lip is formed to cover the flange of the window frame from the protrusion of the flange. With respect to the flange, the lip extends from the outside to the inside of the passenger compartment, and then goes around the flange toward a base end of the flange.

Furthermore, a glass run, such as the one disclosed in the above patent publication, is secured to the window frame from the outside of the passenger compartment. This glass run, referred to as a "hidden type" is provided from the outside of the passenger compartment to cover up a part of the window frame. Such a glass run can be adopted to fulfill a request for the sake of, for example, a design issue of a car.

The lip of the glass run disclosed in the patent publication covers the flange of the window frame while assembled to the flange, and thus is clearly visible. Hence, beneficially, the lip is designed to have relatively high stiffness to reduce move with respect to the flange and unnecessary change in shape after assembled.

In the case of the glass run to be assembled from the outside of the passenger compartment, the glass run attachment plate for assembling the glass run body extends in the inside-outside direction of the passenger compartment; whereas, the flange extends in the vertical direction. That is, the glass run attachment plate and the flange are different in extending direction. Thus, in a first step, the glass run body is moved from the outside of the passenger compartment and assembled to the glass run attachment plate as described above. Required after that is a second step; that is, to assemble the lip to the flange.

However, if the lip is designed to have high stiffness out of the need to reduce the movement and change in shape while assembled to the flange, assembly-related problems below could arise in both of the first and second steps.

Specifically, in the first step, the glass run body is moved from the outside to the inside of the passenger compartment to be assembled to the glass run attachment plate. Here, the lip makes contact with a face of the flange toward the outside of the passenger compartment, and creates a push-back force toward the outside of the passenger compartment. The high stiffness of the lip as described above increases the push-back force of the lip. Since this increased push-back force acts against (toward the outside of the passenger compartment) the assembling direction of the glass run body, it makes increasing an assembly force of the glass run body. As a result, the glass run body requires extra force to be assembled, and makes the assembly work for the glass run difficult. In particular, this problem will be more remarkable if the shape of the assembled glass run is different from that of the molded glass run, and the lip creates a large push-back force.

The second step involves assembling the lip to the flange. The glass run body has already been secured to the glass run attachment plate, and hardly moves with respect to a door frame. Here, the lip is positioned outside of the passenger compartment with respect to the flange. In this position, the shape of the lip needs to be changed so that the lip opens, and, while maintaining the opening, the lip needs to be brought toward the inside of the passenger compartment via the protrusion of the flange. In this case, the high stiffness of the lip could cause a problem; that is, extra force is required to open and keep opening the lip, making the assembly work difficult.

Conceived in view of the above problems, the present disclosure facilitates assembly of a glass run to a door frame from an outside of a passenger compartment, and, when a lip covering a flange of the door frame is formed into a single piece with the glass run, provides the lip with sufficient stiffness to keep the lip of the assembled glass run from moving and changing in shape.

SUMMARY

In the present disclosure, a recess is formed on a portion of a lip not to reduce the overall stiffness of the lip, and the portion provided with the recess acts as a pivot of a change in the shape of the lip during the assembly of the lip.

A first aspect of the present disclosure is directed to a glass run for an automotive door, the glass run being assembled from an outside of a passenger compartment to a window frame extending to define a window opening of the automotive door, and sealing a gap between the window frame and a window glass. The glass run includes: a glass run body assembled to a glass run attachment plate, the glass run attachment plate being formed on the window frame and extending toward the outside of the passenger compartment; and a lip formed into a single piece with the glass run body, and covering a flange formed on the window frame and protruding toward the window opening, the lip being made of an elastic material. The lip is formed to bend from the outside of the passenger compartment with respect to the flange, along a protrusion of the flange, and then toward an inside of the passenger compartment with respect to the flange. The lip includes a recess formed on an interior face of a portion, of the lip, covering the protrusion of the flange.

When the glass run is assembled to the window frame in this configuration, first the glass run body is moved with respect to the window frame from the outside toward the inside of the passenger compartment. When the glass run body is moved toward the inside of the passenger compartment, the lip could make contact with, for example, a face of the flange toward the outside of the passenger compartment in the window frame. Here, the recess is formed on an interior face of the lip, and a portion provided with the recess acts as the pivot of a change in the shape of the lip, making the change easy. Accordingly, when the lip makes contact with, for example, the face of the flange toward the outside of the passenger compartment, the push-back force of the lip decreases. Hence, the increase in the assembly force is small even though the push-back force of the lip acts against the assembling direction of the glass run body when the glass run body is assembled to the glass run attachment plate of the window frame.

Then, when the lip is assembled to the flange of the window frame, the shape of the lip is elastically changed to open the lip. Here, the portion provided with the recess acts as the pivot, and allows the shape of the lip to be changed with little force so that the lip is easily brought to the inside of the passenger compartment with respect to the flange.

Specifically, even though the lip has high stiffness to reduce such risks as movement and a change in shape of the assembled lip, the recessed portion formed on the lip curbs an increase in the assembly force of the lip to be assembled to the window frame. Such features contribute to facilitating the assembly work.

Moreover, the recessed portion is formed on the interior face of the lip, making the recessed portion invisible from outside. As a result, forming the recessed portion does not adversely affect the appearance of the glass run.

Furthermore, since the recessed is formed merely on a portion of the lip, the lip is sufficiently made stiff overall if, for example, other portions of the lip are formed thicker. Hence, when the glass run is assembled, the move and deformity of the lip is effectively reduced.

In a second aspect of the present disclosure according to the first aspect, a portion, of the lip provided with the recess is thinner than an exterior portion of the lip, the exterior portion facing the outside of the passenger compartment.

Such a feature allows the portion, of the lip, provided with the recess to be thin, contributing to reliably reducing force required to change the shape of the lip.

In a third aspect of the present disclosure according to the first aspect, the lip is continuous to extend along a circumferential edge of the window opening of the window frame, and the recessed is shaped into a continuous groove in a longitudinal direction of the lip.

Specifically, since extending along the circumferential edge of the window opening, the glass run may have the same longitudinal cross-section by extrusion molding. In the extrusion molding, the recess of the lip is shaped into a continuous groove in a longitudinal direction of the glass run. In other words, a lip with the recess is easily produced by extrusion molding.

In a forth aspect of the present disclosure according to the first disclosure, the recess of the lip includes a holder holding an assembly assisting member for applying force, to the lip, toward a direction in which the lip opens when assembled to the flange.

Specifically, when the lip is opened and assembled to the flange, the assembly assisting member held in the recess may easily apply force to the lip in an opening direction. Such a feature further facilitates the assembly work.

In a fifth aspect of the present disclosure according to the fourth disclosure, the recess of the lip includes a cord member for applying the force, to the lip, toward the direction in which the lip opens when assembled to the flange.

Such a feature allows the cord member to be held in the recess of the lip, so that the cord member does not bother the assembly worker when he or she assembles the lip to the flange. When pulled by the assembly worker, the cord member may easily apply force to the lip from outside in the opening direction.

Moreover, the cord member is held in the recess. When the cord member is pulled, the force from the cord member acts intensively on the recess of the inner decoration lip. Such features allow the lip to reliably open with the portion provided with the recess working as the pivot.

In a sixth aspect of the present disclosure according to the fifth disclosure, the cord member is held in, and bonded to, the recessed of the lip.

Such a feature allows the glass run and the cord member to be formed into a single piece and assembled to the window frame, successfully reducing such risks as the cord member coming off the glass run and moving away from a predetermined position before and during the assembly.

In the first aspect, the lip is formed into a single piece with the glass run body, and the recess is formed on an interior face of a portion, of the lip, covering the protrusion of the flange. Here, the grass run body is assembled to the window frame from the outside of the passenger compartment, and the lip is formed to bend to cover the flange of the window frame. Such features may provide the lip with sufficient stiffness to reduce the move and deformity in the shape of the assembled lip, and facilitate the assembly work for the glass run.

In the second aspect, a portion, of the lip, provided with the recess may be made thin such that the recess may reliably reduce force required to change a shape of the lip. The second aspect reduces the risk that the lip is folded on the exterior portion, contributing to facilitating the assembly work for the glass run.

In the third aspect, a glass run having a lip with the recess may be efficiently produced by extrusion molding.

In the fourth aspect, the assembly assisting member for applying force to the lip may be held in the recess of the lip. The use of the assembly assisting member contributes to further facilitating the assembly work.

In the fifth aspect, the cord member is held in the recess of the lip not to bother the assembly worker when he or she assembles the lip to the flange. When pulled by the assembly worker, the cord member may easily apply force to the lip in the opening direction from the outside of the lip. When the cord member is pulled, the force from the cord member acts intensively on the portion, of the lip, provided with the recess. The fifth aspect allows the lip to reliably open with the portion provided with the recess working as the pivot, contributing to further facilitating the assembly work.

In the sixth aspect, the glass run and the cord member are formed into a single piece and assembled to the window frame. The sixth aspect reduces such risks as the cord member coming off the glass run and moving away from a predetermined position before and during the assembly, contributing to further facilitating the assembly work.

DETAILED DESCRIPTION

An embodiment of the present disclosure will be described in detail below, with reference to the drawings. Note that a preferable embodiment below is essentially a mere example, and does not intend to limit the scope of the, application of, or the use of the present disclosure.
(Configuration of Door)

Figure 1:
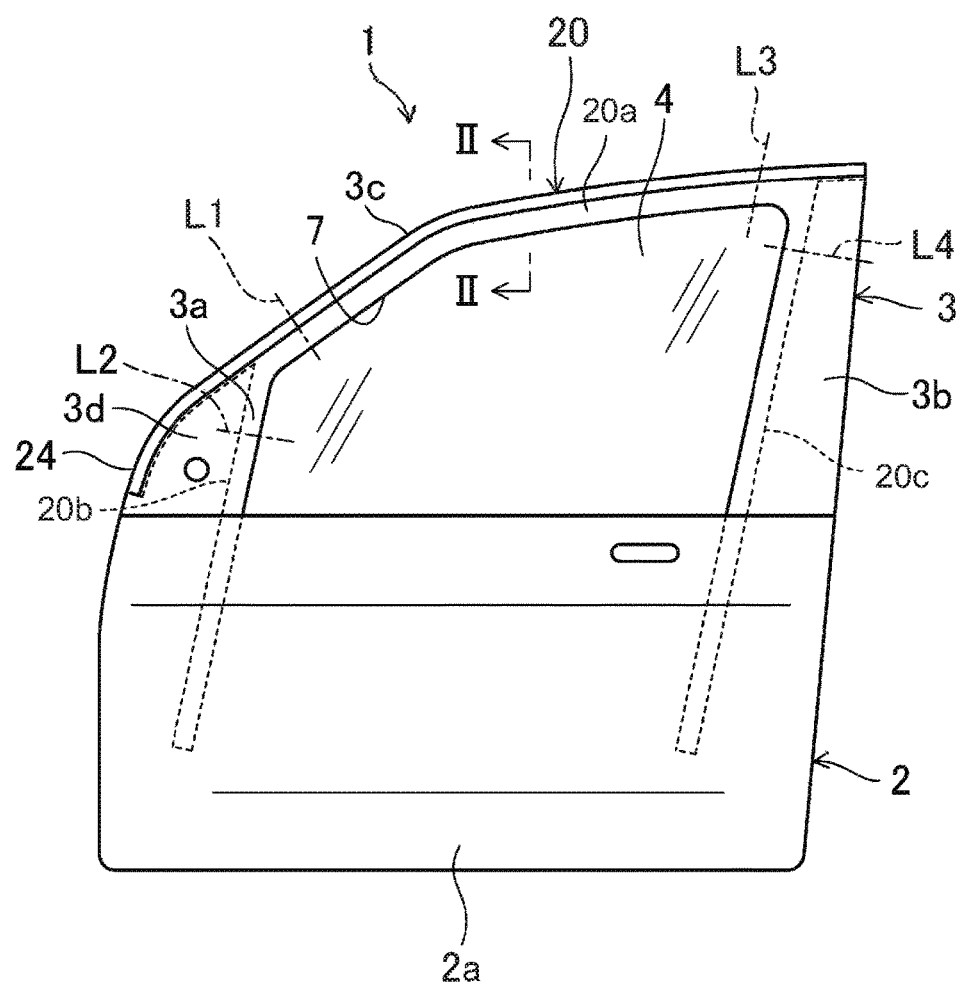
FIG. 1 is a view of an automotive door seen from the outside of a passenger compartment, the automotive door including a glass run for the automotive door according to an embodiment.

FIG. 1 is a side view of an automotive door 1 seen from the outside of a passenger compartment. The automotive door 1 includes a glass run 20 for an automotive door according to an embodiment of the present disclosure. This automotive door 1 is a front door disposed to a side of a car (not shown) in the front, and opens and closes an opening (not shown) defined in the front of the car on the side. Although not shown, the present disclosure may be applied to a glass run provided to a rear door if the rear door is disposed to a side of the car.

Note, in the description of this embodiment, the front and the rear of the car are simply referred to as the "front" and the "rear."

The automotive door 1 includes a door body 2 which is substantially a lower half of the automotive door 1, and a window frame 3 which is substantially an upper half of the front door 1. Even though not shown, a front end of the door body 2 is secured to a pillar of a body via a hinge having a vertically extending rotational pin. The door body 2 includes an inner panel (not shown) and an outer panel 2a made of, for example, steel plates. The door body 2 houses, for example, a window glass 4 which rises and falls, and a window regulator (not shown) to raise and lower the window glass 4.

Figure 2:
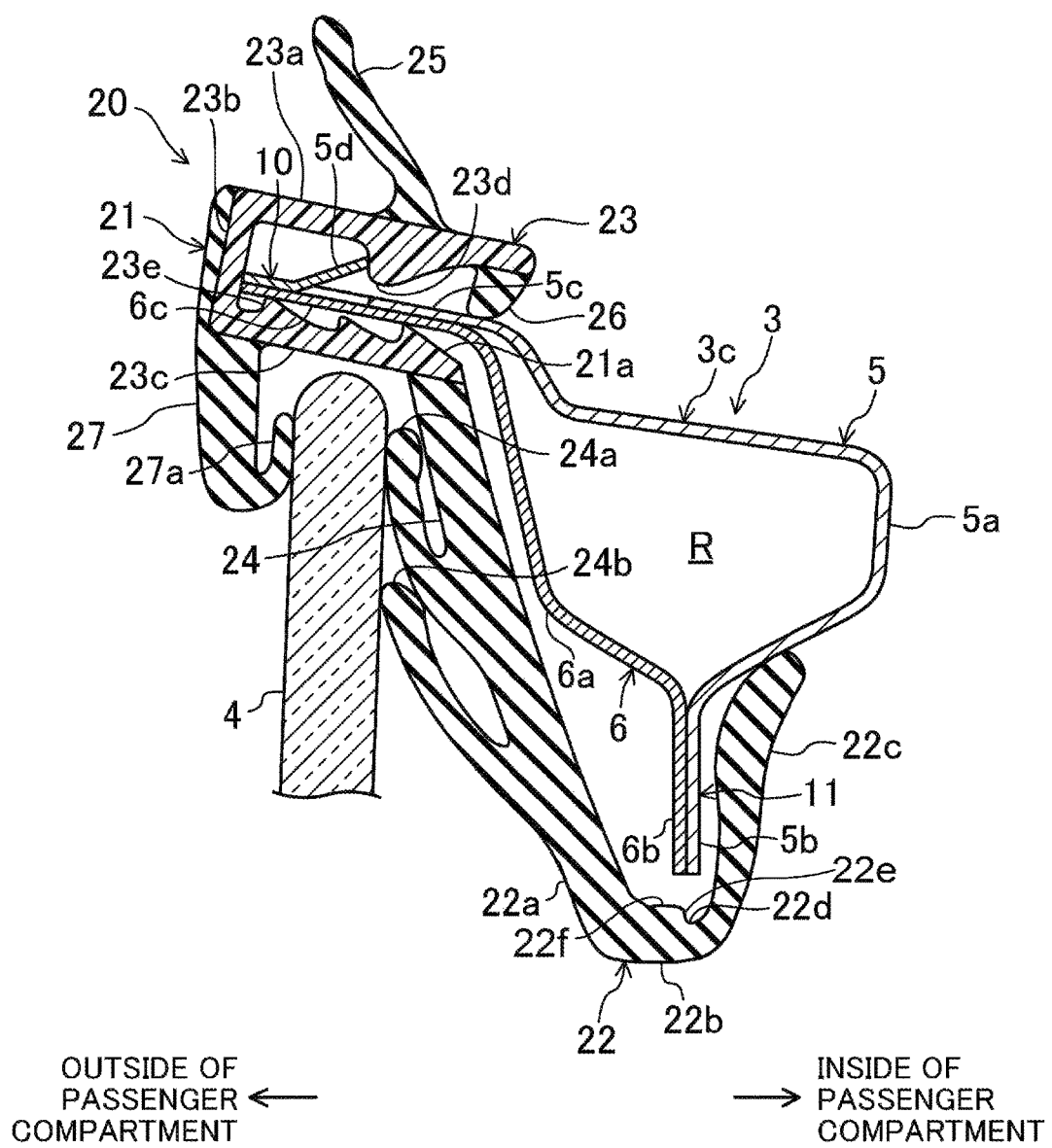
FIG. 2 is a cross-sectional view taken from line II-II of FIG. 1.

The window frame 3 functions as a sash to hold a circumferential edge of the window glass 4, and extends to define a window opening 7. The window opening 7 defined by the window frame 3 is opened and closed with the window glass 4. As illustrated in FIG. 2, the window frame 3 according to this embodiment includes a combination of a first panel 5 and a second panel 6 made of, for example, pressed metal plates. Note that the window frame 3 may be made by roll forming, for example.

As illustrated in FIG. 1, the window frame 3 includes a front frame 3a, a rear frame 3b, and an upper frame edge 3c. The front frame 3a extends upward from an upper front edge of the door body 2. The rear frame 3b extends upward from an upper rear edge of the door body 2. The rear frame 3b extends above the front frame 3a. The upper frame edge 3c longitudinally extends, between a top end of the front frame 3a and a top end of the rear frame 3b, along an edge (not shown) of a roof of the body. Note that the shape of the upper frame edge 3c shall not be limited to that illustrated in FIG. 1. The upper frame edge 3c may curve upward overall. The position of the curved portion and the sloping angle of the upper frame edge 3c may be set in any given manner to conform to the shape of the roof of the body.

In front of the front frame 3a of the window frame 3, a door mirror securing portion 3d is provided. A not-shown door mirror is secured to the door mirror securing portion 3d. An upper edge of the door mirror securing portion 3d is continuous with a front end of the upper frame edge 3c of the window frame 3.

As illustrated in FIG. 2, the window frame 3 is provided with a glass run attachment plate 10 extending toward the outside of the passenger compartment, and an inward flange 11 protruding toward the inside of the window opening 7 (see in FIG. 1). Since the inward flange 11 protrudes toward the inside of the window opening 7, the upper frame edge 3c protrudes downward. The front frame 3a and the rear frame 3b may also be similar to the upper frame edge 3c in construction. Here, the front frame 3a protrudes toward the rear, and the rear frame 3b protrudes toward the front. Note that the front frame 3a and the rear frame 3b may be different in construction from the upper frame edge 3c.

The first panel 5 and the second panel 6 included in the window frame 3 define a hollow R inside the window frame 3. Specifically, the first panel 5 facing the inside of the passenger compartment has an inside bulge 5a in the vertical middle of the first panel 5. The inside bulge 5a bulges toward the inside of the passenger compartment. The second panel 6 facing the outside of the passenger compartment has an outside bulge 6a in the vertical middle of the second panel 6. The outside bulge 6a bulges toward the outside of the passenger compartment. An inside plate 5b is formed on the first panel 5 to inside the window opening 7. The inside plate 5b extends toward the inside of the window opening 7. An inside plate 6b is formed on the second panel 6 to inside the window opening 7. The inside plate 6b extends toward the inside of the window opening 7. An outside plate 5c is formed on the first panel 5 to the outside of the window opening 7. The outside plate 5c extends toward the outside of the passenger compartment. An outside plate 6c is formed on the second panel 6 to the outside of the window opening 7. The outside plate 6c extends toward the outside of the passenger compartment.

The inside plate 5b of the first panel 5 and the inside plate 6b of the second panel 6 overlap with each other in the inside-outside direction of the passenger compartment and are joined together; meanwhile, the outside plate 5c of the first panel 5 and the outside plate 6c of the second panel 6 vertically overlap with each other and joined together. Hence, the outside bulge 6a and the inside bulge 5a fit together to define the hollow R. Moreover, the inside plate 5b of the first panel 5 and the inside plate 6b of the second panel 6 constitute the inward flange 11. Furthermore, the outside plate 5c of the first panel 5 and the outside plate 6c of the second panel 6 constitute the glass run attachment plate 10. Included in the upper part of the glass run attachment plate 10, the outside plate 5c of the first panel 5 is provided with a raised cut 5d. The raised cut 5d is a portion of the outside plate 5c cut and raised upward. The base end of the raised cut 5d is positioned outside the passenger compartment with respect to the outside plate 5c. The raised cut 5d slants upward as extending from a base end of the raised cut 5d toward the inside of the passenger compartment.

(Configuration of Glass Run)

The glass run 20 covers up at least the outside of the window frame 3 with respect to the passenger compartment. Referred to as a "hidden type", the glass run 20 is assembled from the outside of the passenger compartment to the window frame 3, and functions as a sealing member to seal a gap between the window frame 3 and the window glass 4.

The details of the glass run 20 will be described later. The glass run 20 is formed to cover an exterior face of the glass run attachment plate 10 (i.e., an exterior face of the window frame 3) and the inward flange 11.

The glass run 20 includes a glass run body 21 and an inner decoration lip 22. The glass run body 21 is assembled to the glass run attachment plate 10 of the window frame 3, and the inner decoration lip 22 is formed into a single piece with the glass run body 21. A core 23 is provided to an upper portion of the glass run body 21. In the glass run body 21, the core 23 is different in material from other parts. Specifically, the core 23 may be made of any given material such as hard resin (e.g. resin in which talc and glass fibers are blended together), an aluminum alloy, steel, and stainless steel. In the glass run body 21, the parts other than the core 23 may be made of an elastic material softer than the core 23. Examples of the elastic material include ethylene-propylene-diene rubber (EPDM) rubber and thermoplastic elastomer olefin (TPO). Moreover, the inner decoration lip 22 is equivalent to a lip of the present disclosure, and made of the above EPDM and TPO. The EPDM and TPO may be a foam material or a solid material.

The glass run 20 is a combination of an extrusion-molded portion made by extrusion molding and a die-formed portion made by die forming. As illustrated in FIG. 1, a die-formed portion is provided between boundaries L1 and L2 defined by dashed-dotted lines on the border between an upper glass run edge 20a and a front longitudinal glass run edge 20b of the glass run 20. Moreover, another die-formed portion is provided between boundaries L3 and L4 defined by dashed-dotted lines on the border between the upper glass run edge 21 and a rear longitudinal glass run edge 20c of the glass run 20. The extrusion-molded portion is other than the above two die-formed portions.

As illustrated in FIG. 2, the core 23 of the glass run body 21 is formed to have a insertion groove 21a opening toward the inside of the passenger compartment to receive the glass run attachment plate 10 of the window frame 3. This insertion groove 21a is formed on the interior face, of the glass run body 21, toward the passenger compartment, and shaped into a slit extending along the glass run attachment plate 10.

The core 23 of the glass run body 21 is made of a member having a substantially U-shaped cross-section opening toward the inside of the passenger compartment. The member includes: an outer plate 23a extending toward the inside-outside direction of the passenger compartment; an end plate 23b extending downward from an end, of the outer plate 23a, to the outside of the passenger compartment; and an inner plate 23c extending from a lower end of the end plate 23b toward the inside of the passenger compartment substantially in parallel with the outer plate 23a. The opening of the core 23 toward the inside of the passenger compartment acts as the insertion groove 21a. Thus, the glass run attachment plate 10 of the window frame 3 is inserted through the opening of the core 23 into the core 23. Here, the outer plate 23a and the inner plate 23c of the core 23 extend in the inside-outside direction of the passenger compartment, and thus the glass run attachment plate 10 is inserted in the inside-outside direction of the passenger compartment. The glass run attachment plate 10 is deeply inserted into the core 23. When inserted, the glass run attachment plate 10 has an end toward the outside of the passenger compartment abut onto the end plate 23b of the core 23.

On a lower face of the outer plate 23a in the core 23, a first protrusion 23d is formed. The first protrusion 23d protrudes downward from a middle, in the inside-outside direction of the passenger compartment, of the lower face. From the outside of the passenger compartment, the raised cut 5d of the inserted glass run attachment plate 10 comes into contact, and engages, with the first protrusion 23d. Moreover, on an upper face of the inner plate 23c in the core 23, second protrusions 23e are formed. The second protrusions 23e are arranged at intervals in the inside-outside direction of the passenger compartment, and protrude upward. The second protrusions 23e come into contact with a lower face of the inserted glass run attachment plate 10.

The glass run body 21 includes: an inside sealing plate 24; an upper lip 25, an elongated protrusion 26; and an outside sealing lip 27 all of which are formed into a single piece with the core 23.

The inside sealing plate 24 extends downward from an end of the lower face of the inner plate 23c of the core 23, the end being positioned toward the inside of the passenger compartment. The inside sealing plate 24 has a lower end positioned below that of the outside sealing lip 27. The inside sealing plate 24 slants toward the inside of the passenger compartment, as extending downward. On an exterior face of the inside sealing plate 24, a first inner sealing lip 24a is formed to extend toward the outside of the passenger compartment. On the exterior face of the inside sealing plate 24, a second inner sealing lip 24b is formed to extend toward the outside of the passenger compartment. Here, the second inner sealing lip 24b is positioned below the first inner sealing lip 24a. The first inner sealing lip 24a and the second inner sealing lip 24b slant upward as extending toward the outside of the passenger compartment, and make contact with an interior face of the window glass 4. Moreover, an interior face of the inside sealing plate 24 is provided to face the outside bulge 6a of the second panel 6 in the window frame 3.

The upper lip 25 is formed to protrude upward from the middle, in the inside-outside direction of the passenger compartment, of the upper face of the outer plate 23a in the core 23. When the automotive door 1 is closed, the upper lip 25 makes contact with a body panel (not shown) and seals a gap between the body and the automotive door 1. The elongated protrusion 26 is formed to protrude downward from an end of the lower face of the outer plate 23a in the core 23, the end being positioned toward the inside of the passenger compartment. The elongated protrusion 26 has a protruding portion coming into contact with an upper face of the glass run attachment plate 10 inserted into the insertion groove 21a. This contact seals the gap between the glass run attachment plate 10 and the core 23.

The outside sealing lip 27 is formed into a single piece with a face, of the end plate 23b in the core 23, toward the outside of the passenger compartment, and extends downward. Below the outside sealing lip 27, a glass contacting portion 27a is provided to bend toward the inside of the passenger compartment and protrude upward. This glass contacting portion 27a makes contact with an exterior face of the window glass 4.

The inner decoration lip 22 is formed to bend from the outside of the passenger compartment with respect to the inward flange 11, along a protrusion of the inward flange 11, and then toward the inside of the passenger compartment with respect to the inward flange 11. Specifically, the inner decoration lip 22 includes an exterior portion 22a, a lower portion 22b, and an interior portion 22c. The exterior portion 22a extends downward from the lower end of the inside sealing plate 24. The lower portion 22b extends from a lower end of the exterior portion 22a toward the inside of the passenger compartment. The interior portion 22c extends upward from an end, of the lower portion 22b, close to the inside of the passenger compartment. The exterior portion 22a, the lower portion 22b, and the interior portion 22c constitute the inner decoration lip 22 to have a substantially U-shaped cross-sectional shape opening upward. The exterior portion 22a of the inner decoration lip 22 is provided to face, and cover, the face of the inward flange 11 toward the inside of the passenger compartment. The exterior portion 22a may make contact with the inward flange 11. The lower portion 22b of the inner decoration lip 22 is provided to face, and cover, a lower end of the inward flange 11. A gap appears between the lower portion 22b and the lower end of the inward flange 11; however, this gap may be closed. The interior portion 22c of the inner decoration lip 22 is provided to face, and cover, a face of the inward flange 11 toward the outside of the passenger compartment. The interior portion 22c also cover a lower portion of the inside bulge 5a. The upper end of the interior portion 22c comes into contact with the lower portion of the inside bulge 5a. A substantially upper half of the interior portion 22c curves toward the inside of the passenger compartment. Hence, covering the inward flange 11 with the inner decoration lip 22 successfully keeps the inward flange 11 from exposure to improve exterior appearance, and enhances safety by reducing the risk that, for example, a passenger accidentally touches the inward flange 11.

The inner decoration lip 22 includes a recess 22d formed on an interior face of a portion, of the inner decoration lip 22, covering the protrusion of the inward flange 11. As shown, the lower portion 22b of the lip 22 has a step with a rise 22e and a run 22f, wherein at least a portion of the run 22f extends underneath the flange 11. In this embodiment, the recess 22d is formed on the border between the lower portion 22b and the interior portion 22c of the inner decoration lip 22. The portion with the recess 22d is thinner than another portion of the inner decoration lip 22; that is, a portion on which the recess 22d is not formed. The inner decoration lip 22 is continuous to extend along a circumferential edge of the window opening 7. Hence, the recess 22d is shaped into a continuous groove in a longitudinal direction of the inner decoration lip 22. Formation of the recess 22d allows the inner decoration lip 22 to be opened with little force when external force is applied toward a direction in which the inner decoration lip 22 (the direction illustrated by an arrow C in FIG. 6) opens, because the portion of the recess 22d acts as a pivot of the opening.

Figure 3:
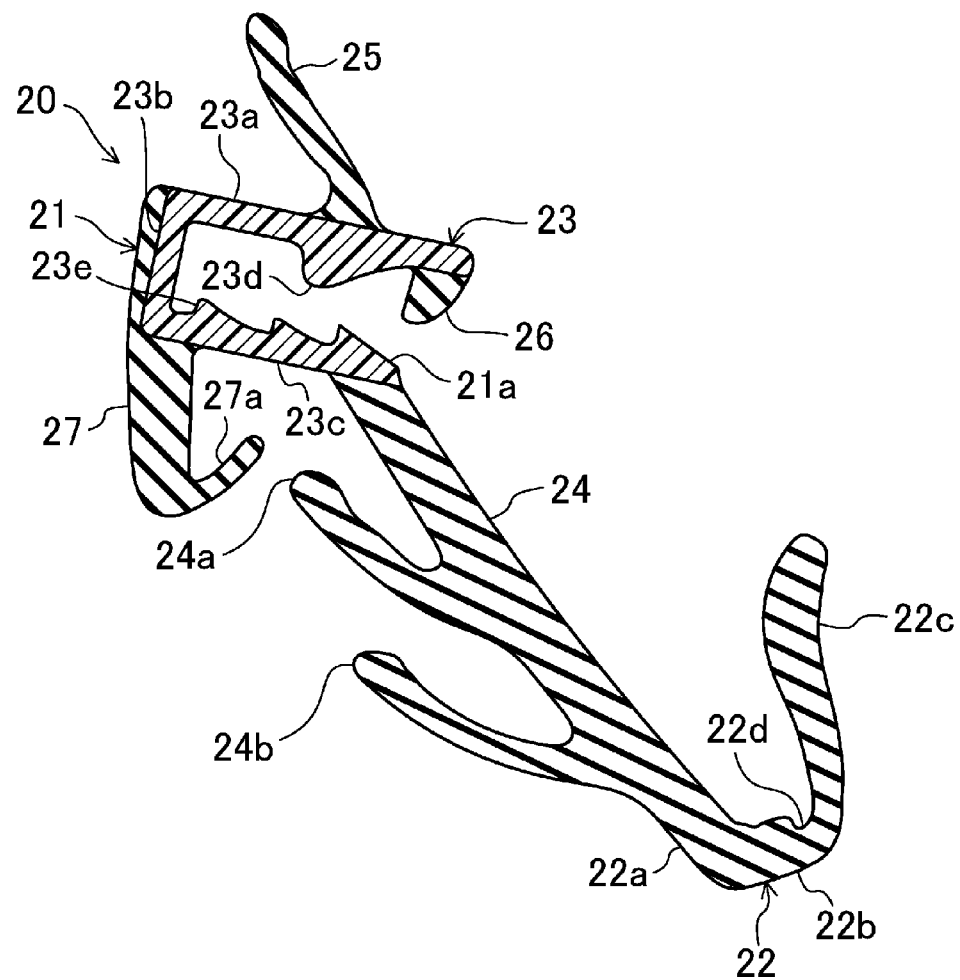
FIG. 3 is a cross-sectional view corresponding to FIG. 2, and illustrating the glass run after molding.

FIG. 3 illustrates a shape of the molded glass run 20. Compared with the inside sealing plate 24 of the glass run 20 assembled to the window frame 3 (see FIG. 2), the inside sealing plate 24 of the molded glass run 20 is shaped to have a gentle angle. Specifically, the glass run 20 is molded with an angle between the inside sealing plate 24 and the inner plate 23c of the core 23 formed wider than that formed when the glass run 20 is assembled. This is to facilitate the production of the glass run 20, and allow the glass run 20 to be assembled while the inside sealing plate 24 and the core 23 firmly make contact with the window frame 3 with elastic force of the inside sealing plate 24 at the completion of the assemble.

(How to Assemble Glass Run)

Figure 4:
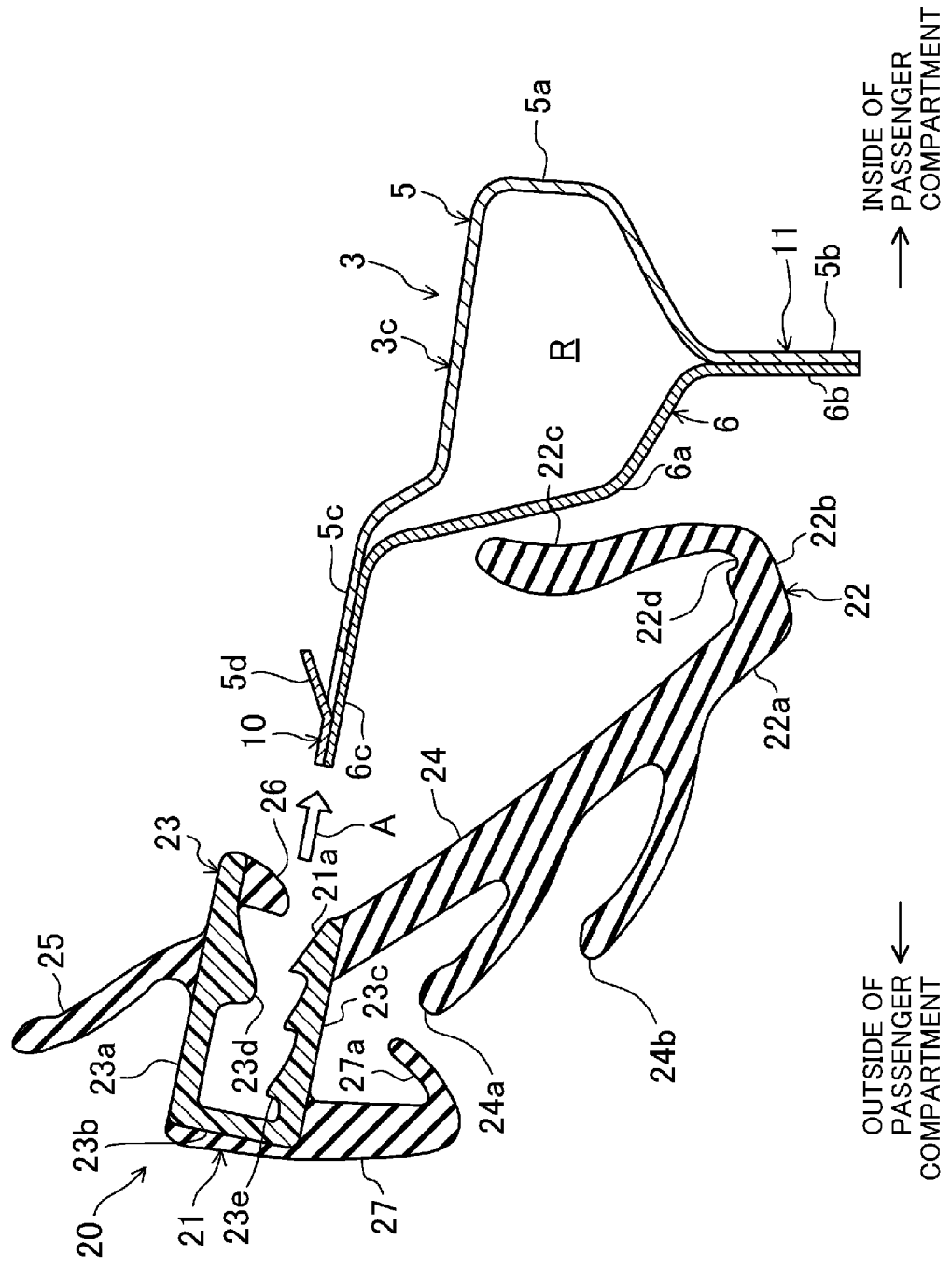
FIG. 4 is a cross-sectional view corresponding to FIG. 2, and illustrating how the glass run starts to be assembled.
Figure 5:
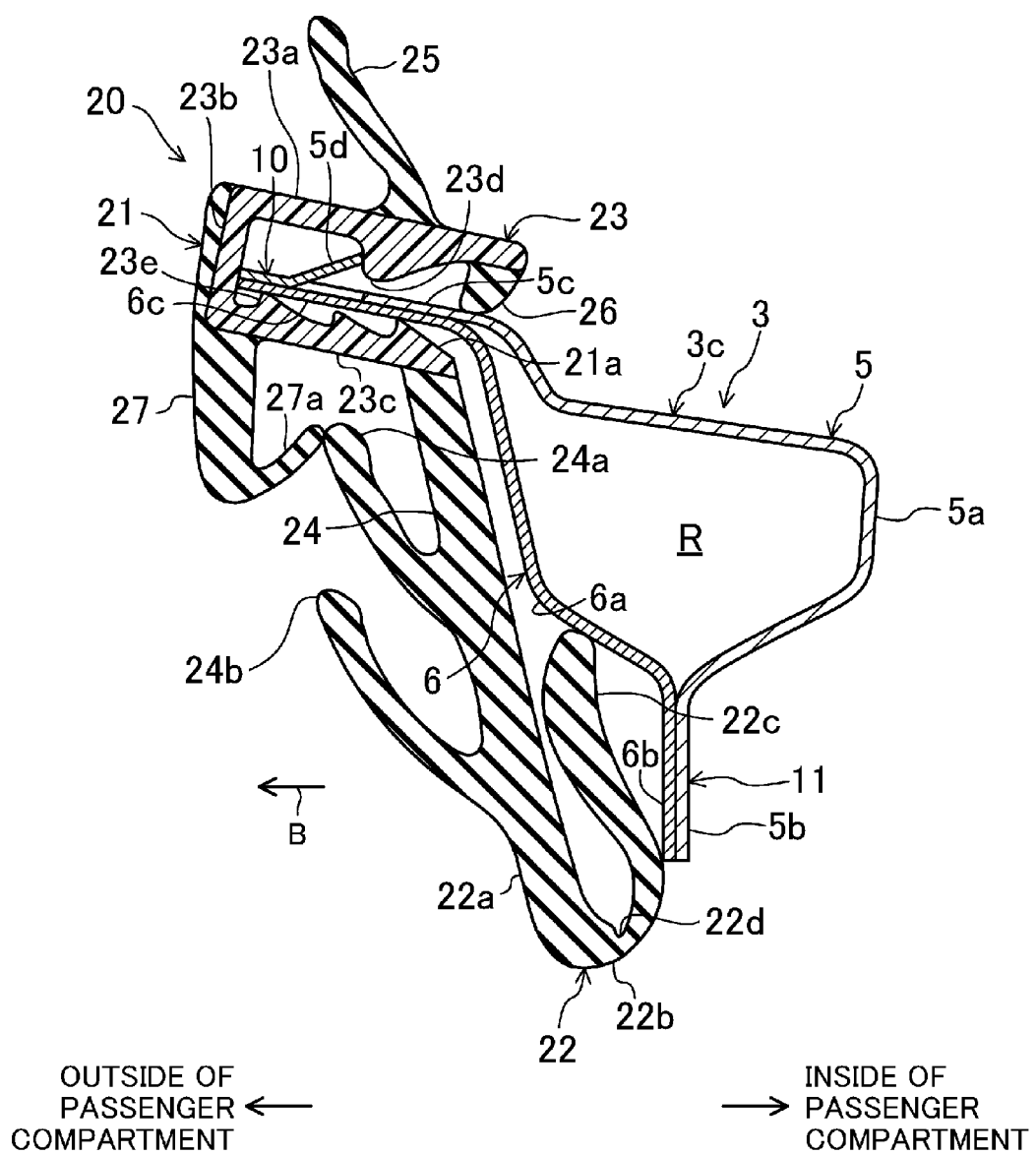
FIG. 5 is a cross-sectional view corresponding to FIG. 2, and illustrating a glass run body immediately after assembly.

Described next is how to assemble the above glass run 20 to the window frame 3. First, as illustrated in FIG. 4, the glass run 20 molded in a shape illustrated in FIG. 3 is provided to the outside of the passenger compartment with respect to the window frame 3, so that the insertion groove 21a of the glass run 20 faces a tip of the glass run attachment plate 10 in the window frame 3. Then, as a white arrow A indicates in FIG. 4, the glass run 20 is relatively moved toward the inside of the passenger compartment with respect to the window frame 3, so that the glass run attachment plate 10 is inserted into the insertion groove 21a. Here, the first protrusion 23d of the core 23 comes into contact with, and moves along, the raised cut 5d of the glass run attachment plate 10. The first protrusion 23d then moves toward the inside of the passenger compartment, and gets over the raised cut 5d. As illustrated in FIG. 5, when the glass run attachment plate 10 is inserted into the insertion groove 21a, the raised cut 5d of the glass run attachment plate 10 comes into contact, and engages, with the first protrusion 23d of the core 23 from the outside of the passenger compartment. The engagement reduces the risk that the glass run attachment plate 10 comes off the insertion groove 21a, and allows the glass run body 21 to be assembled to the glass run attachment plate 10.

While the glass run attachment plate 10 is being inserted into the insertion groove 21a, the interior portion 22c of the inner decoration lip 22 makes contact with such portions as the inside plate 6b and the outside bulge 6a provided to a face, outside the passenger compartment, of the inward flange 11 of the window frame 3. The push-back force created in the contact acts on the glass run 20 toward the outside of the passenger compartment; that is, in a direction opposite the direction in which the insertion groove 21a is inserted (the direction indicated by the arrow B in FIG. 5). In this embodiment, the recess 22d is formed on the inner decoration lip 22. Thus, when the interior portion 22c makes contact with such portions as the inward flange 11, a shape of the interior portion 22c elastically changes with little force at a portion provided with the recess 22d acting as the pivot of the change as illustrated in FIG. 5. Such features reduce the push-back force by the inner decoration lip 22 and require little force when the glass run attachment plate 10 is inserted into the insertion groove 21a, even though as illustrated in FIG. 3 the inside sealing plate 24 is distant from the outside sealing lip 27 and molded into a shape with a large space left between, in particular, the first inner sealing lip 24a and the glass contacting portion 27a. Moreover, after the raised cut 5d of the glass run attachment plate 10 has come into contact, and engaged, with the first protrusion 23d of the core 23 from the outside of the passenger compartment, the push-back force by the inner decoration lip 22 keeps the glass run 20 from coming off the glass run attachment plate 10, stabilizing the setup of the glass run 20 and reducing unnecessary force to be applied to the glass run attachment plate 10. Such features contribute to reducing the risk that the glass run 20 is damaged in this position.

Figure 6:
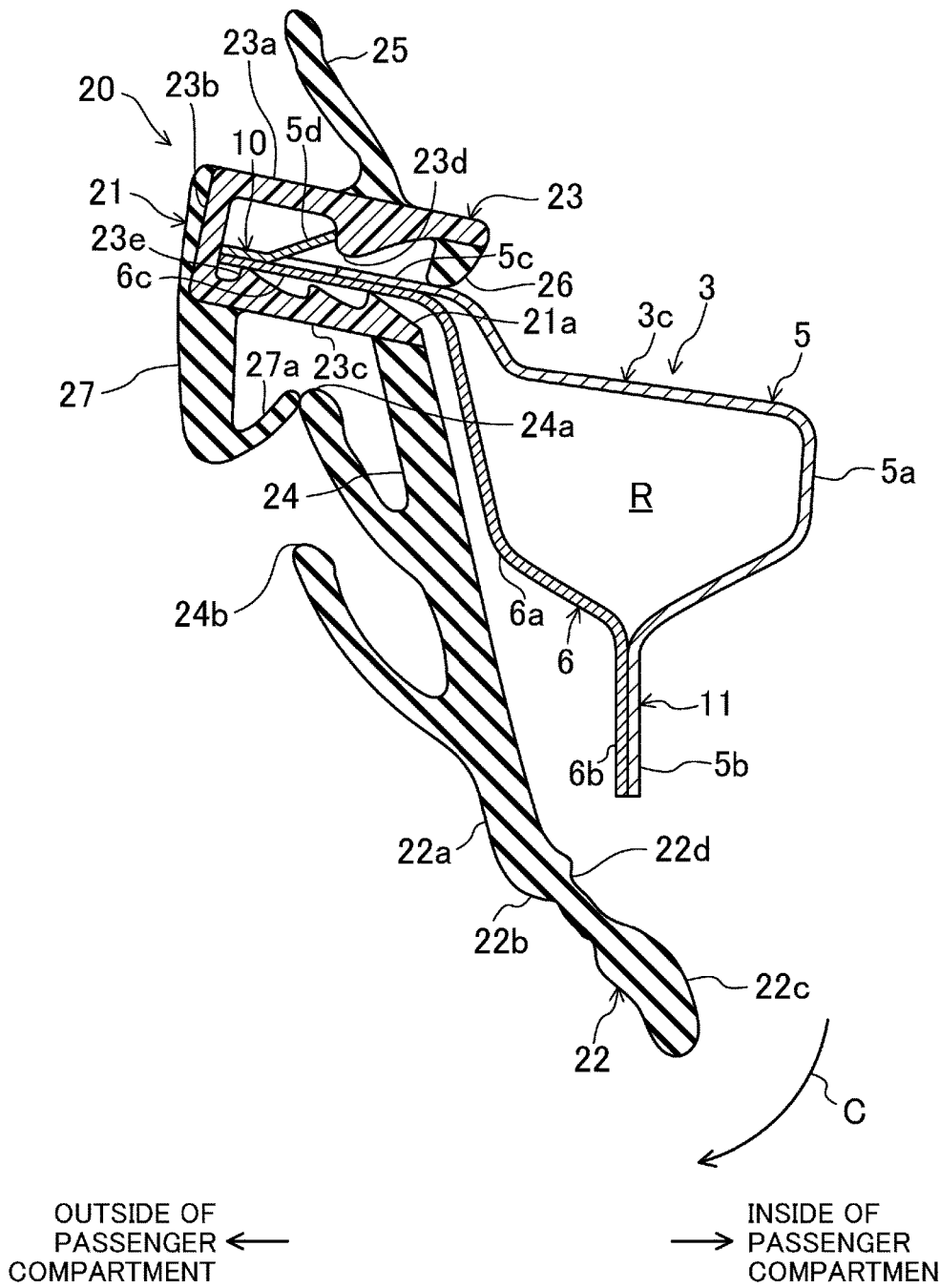
FIG. 6 is a cross-sectional view corresponding to FIG. 2, and illustrating an opened lip.

Next, as illustrated in FIG. 6, the inner decoration lip 22 is assembled to the inward flange 11 of the window frame 3. When the inner decoration lip 22 is assembled, external force is applied along an arrow C illustrated in FIG. 6 to open the inner decoration lip 22. For example, the interior portion 22c of the inner decoration lip 22 is held by a hand or with a tool, and the force is applied to the interior portion 22c. Here, since the portion provided with the recess 22d acts as the pivot so that the shape of interior portion 22c of the inner decoration lip 22 may be changed with little force, the interior portion 22c may easily be moved toward the inside of the passenger compartment with respect to the inward flange 11. Moreover, the recess 22d, reliably acting as the pivot, contributes to smooth assembly work.

Then, in the inner decoration lip 22, the exterior portion 22a is thicker than the recess 22d (i.e., the recess 22d is thinner than the exterior portion 22a), such that the exterior portion 22a does not bend when the assembly worker assembles the inner decoration lip 22 as described above. Furthermore, the inside sealing plate 24 is continuous with the exterior portion 22a of the inner decoration lip 22. The inside sealing plate 24 and the exterior portion 22a are substantially the same in thickness. Such features reduce the risk that the inside sealing plate 24 inadvertently bends while an assembly worker is working on the inner decoration lip 22.

Note that the interior portion 22c of the inner decoration lip 22 has a tip thicker than the recess 22d. Such a feature contributes to fine decorative appearance and facilitation of assembly as described later.

(Effects of Embodiment)

As described above, the inner decoration lip 22 is formed into a single piece with the glass run body 21, and the recess 22d is formed on an interior face of a portion, of the inner decoration lip 22, covering the protrusion of the inward flange 11. Here, the glass run body 21 is assembled to the window frame 3 from the outside of the passenger compartment, and the inner decoration lip 22 is formed to bend to cover the inward flange 11 of the window frame 3. Such features may provide fine decorative appearance (i.e., stiffness to reduce movement and change in shape) to the assembled inner decoration lip 22, and facilitate the assembly work for the glass run 20.

Moreover, the recess 22d is formed on the interior face of the inner decoration lip 22, making the recess 22d invisible from outside. As a result, forming the recess 22d does not adversely affect the appearance of the glass run 20.

Furthermore, since the recess 22d is formed merely on a portion of the inner decoration lip 22, the inner decoration lip 22 is sufficiently stiff overall if, for example, other portions of the inner decoration lip 22 are formed thicker. Hence, when the glass run 20 is assembled, the motion and change in the shape of the inner decoration lip 22 are effectively reduced.

Other Embodiments

Figure 7:
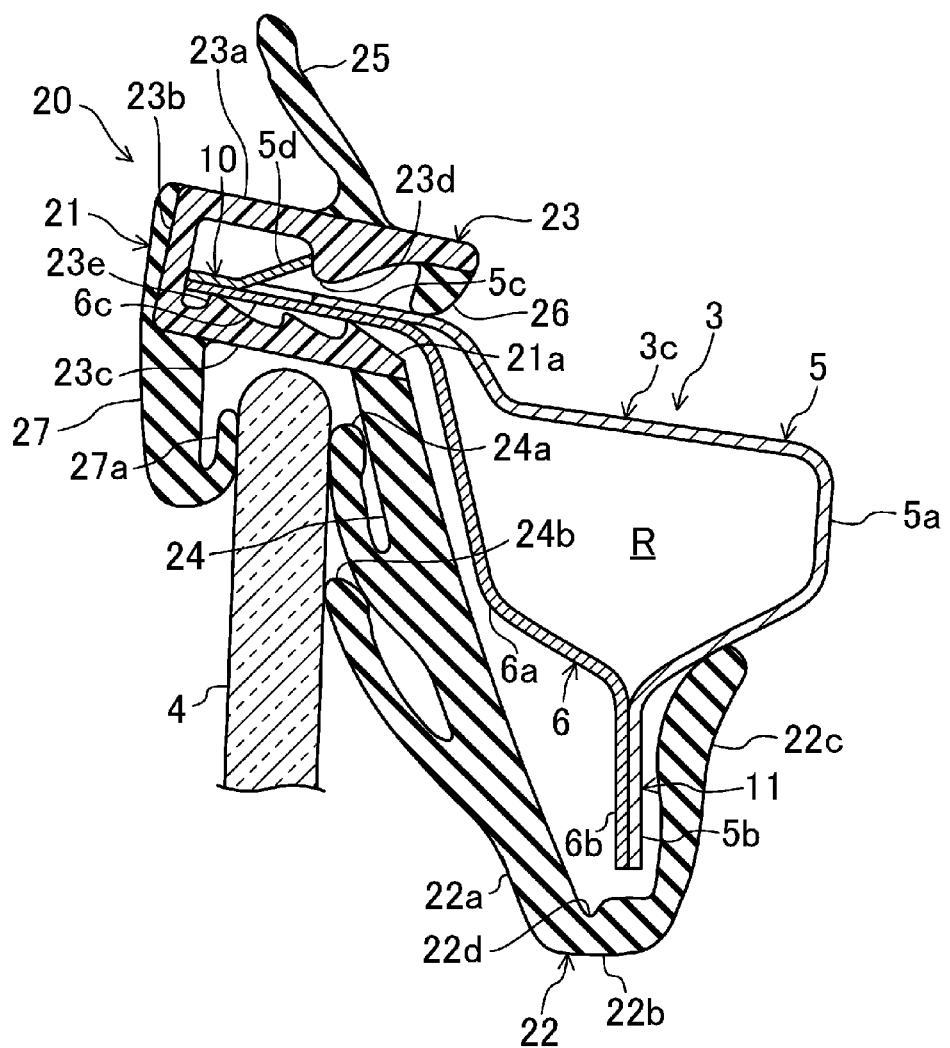
FIG. 7 is a cross-sectional view, corresponding to FIG. 2, according a modified example 1 of the embodiment.

As Modified Example 1 of the embodiment illustrated in FIG. 7, the recess 22d of the inner decoration lip 22 may be formed on the border between the lower portion 22b and the exterior portion 22a. Although not shown, the recess 22d of the inner decoration lip 22 may be formed on both a border between the lower portion 22b and the exterior portion 22a and another border between the lower portion 22b and the interior portion 22c.

Figure 8:
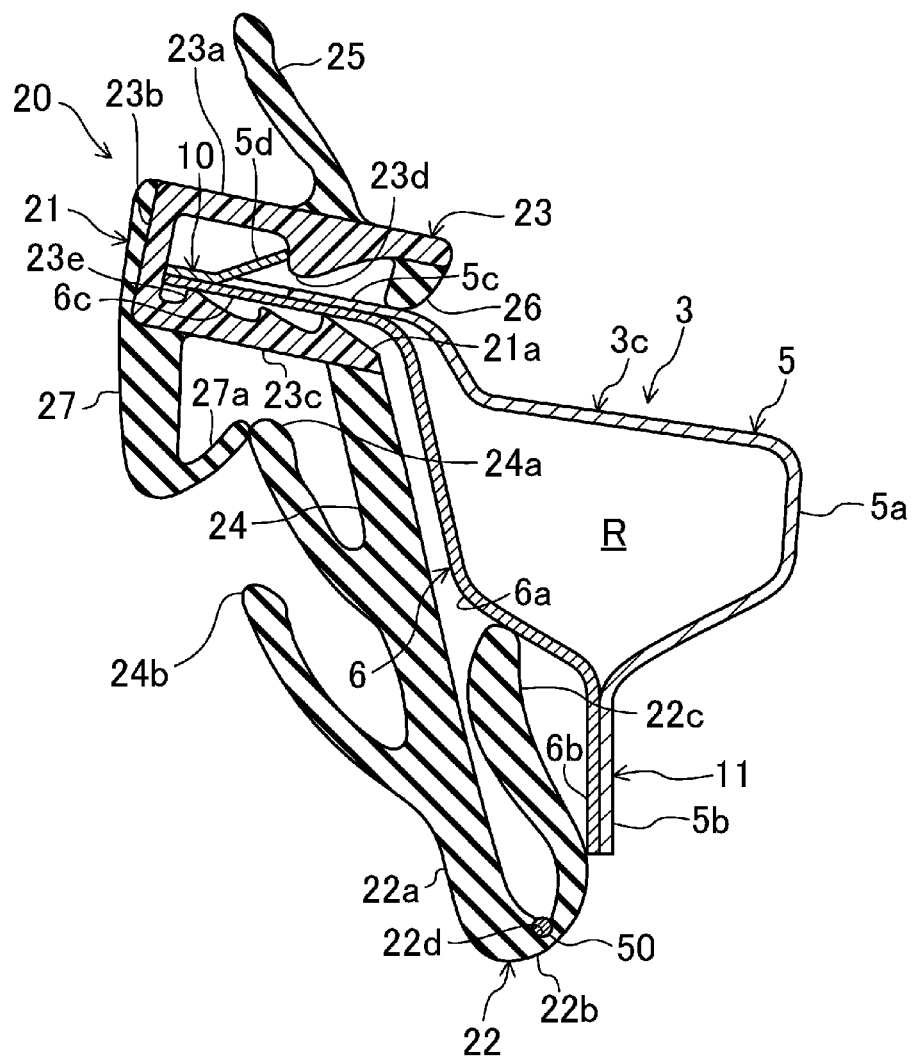
FIG. 8 is a cross-sectional view, corresponding to FIG. 5, according a modified example 2 of the embodiment.
Figure 9:
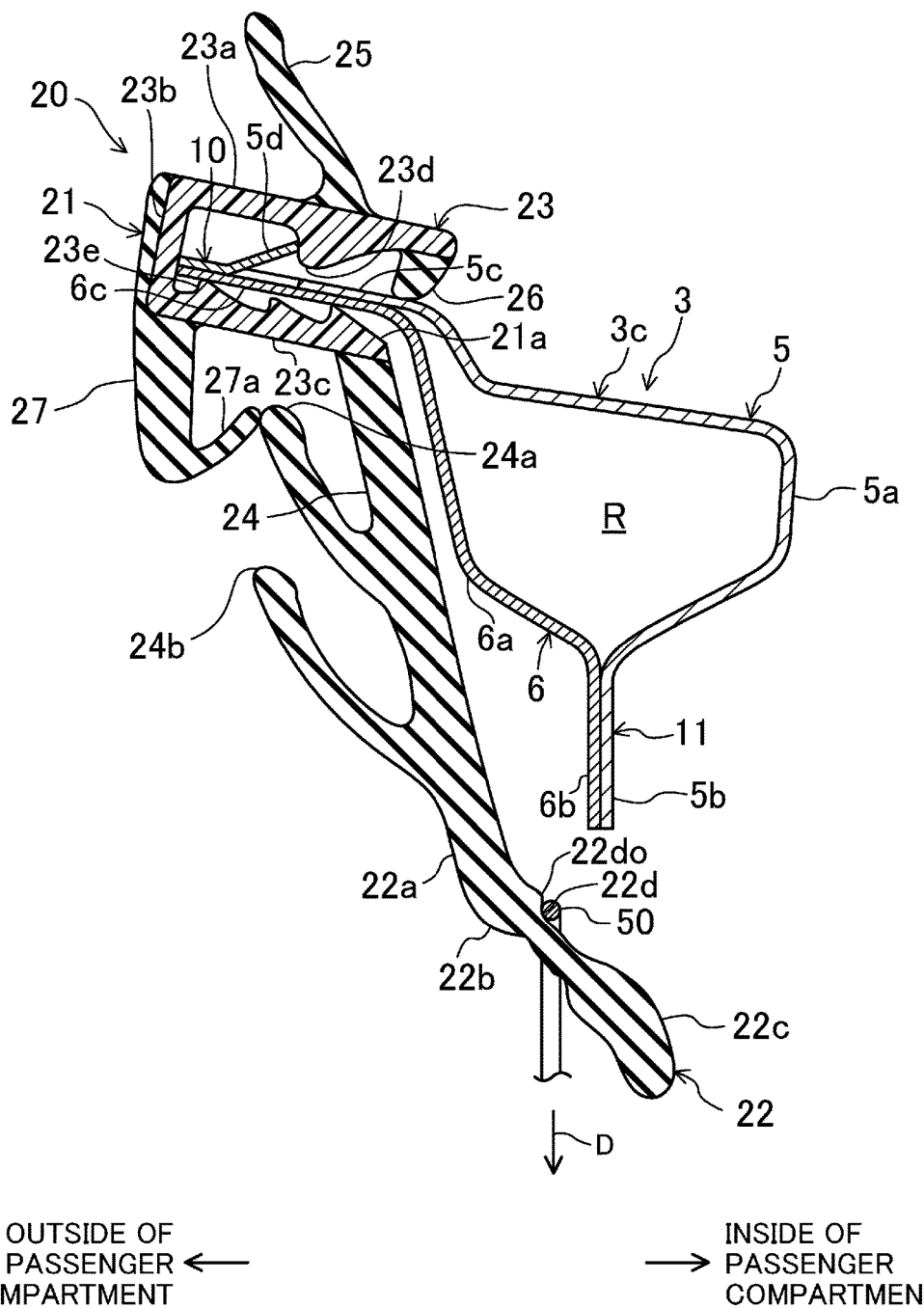
FIG. 9 is a cross-sectional view, corresponding to FIG. 6, according the modified example 2 of the embodiment.

As illustrated in FIGS. 8 and 9, a cord member 50 may be used when the inner decoration lip 22 is assembled to the inward flange 11 of the window frame 3. The cord member 50 works as an assembly assisting member for applying force, to the inner decoration lip 22, toward a direction in which the inner decoration lip 22 opens when assembled to the inward flange 11. The cord member 50 has a longitudinal intermediate portion held in the recess (a holder) 22d of the inner decoration lip 22. Each end of the cord member 50 is allowed to extend outward from one of longitudinal ends of the inner decoration lip 22. Here, each end of the cord member 50 does not have to be allowed to extend outside from one of the longitudinal ends of the inner decoration lip 22.

Then, when the inner decoration lip 22 is opened, an assembly worker, for example, holds in his or her hand one end or both ends of the cord member 50, and pulls the held end or ends down to open the inner decoration lip 22 as illustrated in FIG. 9. Here, the cord member 50 is held in the recess 22d, and when the cord member 50 is pulled, the force from the cord member 50 acts intensively on the recess 22d of the inner decoration lip 22. Such features allow the inner decoration lip 22 to reliably open with the portion provided with the recess 22d working as the pivot. Moreover, since held in the recess 22d of the inner decoration lip 22, the cord member 50 does not bother the assembly worker when he or she assembles the glass run 20 to the inward flange 11. The cord member 50 may be made of any given material such as metal, chemical fiber, cotton, and rubber as long as its flexibility lasts long.

Moreover, the cord member 50 may be held in the inner decoration lip 22, and bonded to the interior face of the recess 22d. For example, when the glass run 20 is molded, the cord member 50 is simultaneously formed together with the glass run 20. Such simultaneous formation allows the cord member 50 to be formed into a single piece, near the recess 22d, with the glass run 20. Here, the cord member 50 may be integrally formed closer toward the inside of the passenger compartment than, in particular, a wall 22do is. Defining the recess 22d and located outside the passenger compartment, the wall 22do is a portion, of the inner decoration lip 22, whose thickness significantly changes. Furthermore, the cord member 50 may be integrally formed with the recess 22d. If the cord is integrally formed with the recess 22d, a portion or all of the cord member 50 may be held in the recess 22d. Unlike the glass run 20 without the recess 22d, the glass run 20 with the recess 22d may reduce the push-back force created by the inner decoration lip 22 as described above, keeping an assembly worker from a troublesome task.

The cord member 50 formed into a single piece with the recess 22d may reduce such risks as the cord member 50 coming off the glass run 20 and moving away from a predetermined position before and during the assembly. Pulling the cord member 50 may open the inner decoration lip 22. This pulling force unfastens the cord member 50 from the inner decoration lip 22.

Moreover, instead of the cord member 50, such an assembly assisting member as a paddle and a stick may be inserted in the recess 22d. Using this assembly assisting member, force may be applied from outside to open the inner decoration lip 22.

Furthermore, the present disclosure may be applied to a die-formed portion.

The above embodiments are mere examples in all respects, and shall not be limited in interpretation. In addition, all the changes, including the shape, to the equivalents in the claims shall be within the scope of the present disclosure.

As can be seen, for use, the glass run for an automotive door may be assembled to a window frame from the outside of a passenger compartment.

What is claimed is:

1. A glass run for an automotive door, the glass run configured to be assembled from an outside of a passenger compartment to a window frame extending to define a window opening of the automotive door, and configured for sealing a gap between the window frame and a window glass, the glass run comprising:

a glass run body assembled to a glass run attachment plate, the glass run attachment plate being formed on the window frame and extending toward the outside of the passenger compartment; and a lip integrally formed with the glass run body to together form a single piece, the lip covering a flange formed on the window frame and protruding toward the window opening, and the lip being made of an elastic material, the glass run body including a sealing plate positioned inside the passenger compartment with respect to the window glass and extending downward, the lip including an exterior portion extending downward from a lower end of the sealing plate, a lower portion extending from a lower end of the exterior portion toward the inside of the passenger compartment, and an interior portion extending upward from an end of the lower portion proximate to the inside of the passenger compartment, the exterior portion, the lower portion, and the interior portion constituting the lip to have a substantially U-shaped cross-sectional shape opening upward, the lower portion being provided to face and cover an end of the flange, an upper end of the interior portion coming into contact with a lower portion of an inside bulge formed on the window frame toward the inside of the passenger compartment, and an upper half of the interior portion curving toward the inside of the passenger compartment, the lip including a recess being formed on an interior face of the lower portion of the lip covering the end of the flange, the lower portion having a step with a rise and run, wherein at least a portion of the run extends underneath the flange, and a portion of the lip being provided with the recess being thinner than an exterior portion of the lip, the exterior portion positioned toward the outside of the passenger compartment.

2. The glass run of claim 1, wherein the lip is continuous to extend along a circumferential edge of the window opening of the window frame, and the recess is shaped into a continuous groove in a longitudinal direction of the lip.

3. The glass run of claim 1, wherein the recess of the lip includes a holder, the holder holding an assembly assisting member, the assembly assisting member configured to apply to the lip toward a direction in which the lip opens when assembling the lip to the flange.

4. The glass run of claim 3, wherein the assembly assisting member includes a cord member.

5. The glass run of claim 4, wherein the cord member is held in, and bonded to, the recess of the lip.

* * * * *